No. 698,093. Patented Apr. 22, 1902.
C. C. WORTHINGTON.
HYDRAULIC OR SIMILAR POWER APPARATUS.
(Application filed Aug. 23, 1900.)
(No Model.) 2 Sheets—Sheet 1.
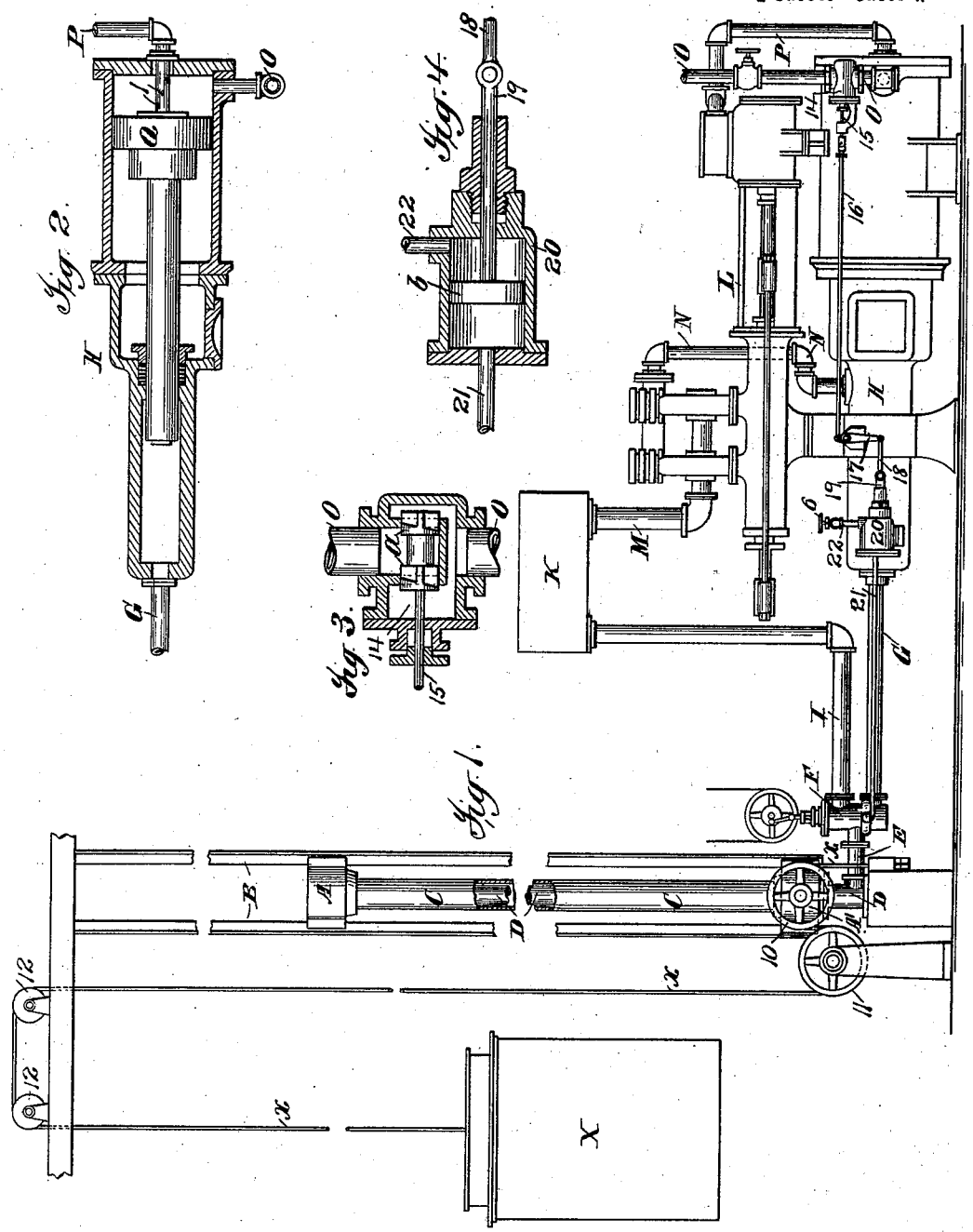
Inventor
Charles C. Worthington
By Philipp, Sawyer, Rice & Kennedy
Attys

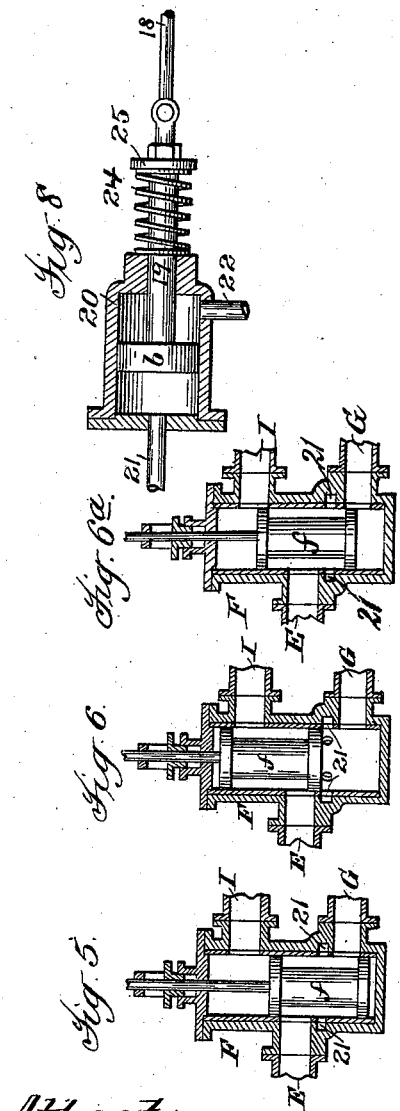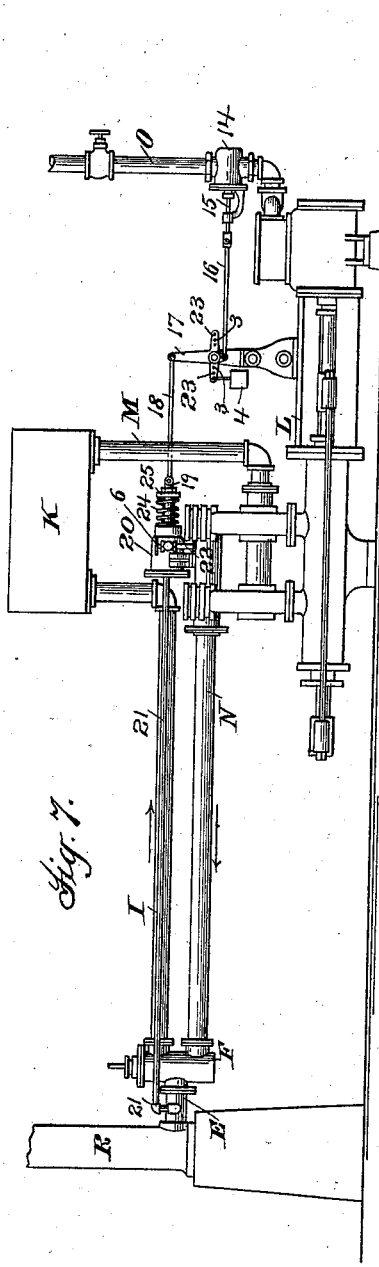

UNITED STATES PATENT OFFICE.

CHARLES C. WORTHINGTON, OF DUNNFIELD, NEW JERSEY.

HYDRAULIC OR SIMILAR POWER APPARATUS.

SPECIFICATION forming part of Letters Patent No. 698,093, dated April 22, 1902.

Application filed August 23, 1900. Serial No. 27,780. (No model.)

*To all whom it may concern:*

Be it known that I, CHARLES C. WORTHINGTON, a citizen of the United States, residing at Dunnfield, county of Warren, and State of New Jersey, have invented certain new and useful Improvements in Hydraulic or Similar Power Apparatus, fully described and represented in the following specification and the accompanying drawings, forming a part of the same.

This invention relates to hydraulic and other fluid-operated power apparatus of that class in which a hydraulic or similar cylinder is used for raising a load or doing other work and in which the pump, accumulator, or similar power apparatus works directly against the load or the resistance of other work on which the cylinder is employed, so that the power required varies with such load or resistance.

The object of the invention is to provide an improved construction of this class by which the operation of the power plant shall be automatically and efficiently controlled, so that the power consumed in the power plant is dependent upon and proportioned to the work to be done, thus securing a more efficient and economical operation of the apparatus. I secure this result by controlling the power plant by the pressures on opposite sides of the operating-valve of the cylinder, these pressures being applied in a steam-power plant to a valve controlling the admission of steam to the steam-accumulator or steam-pump, so that the valve shall be controlled by such pressures, so as to vary the supply to the accumulator or pump in accordance with the work to be done, thus preserving at all times the pressure desired for the work, but avoiding the use of steam in excess of that required for such pressure. The ratio between the pressures on the opposite sides of the operating-valve by which the steam-control valve is operated in one direction or the other to increase or decrease the supply of steam according to the work to be done may be determined finally in the construction of the apparatus and no means for varying this ratio be provided, such constructions being adapted for use where the work upon which the cylinder is to be used is always of the same character. In many cases, however, hydraulic and similar cylinders are employed on work where the varying conditions make it desirable to adjust the control apparatus of the present invention so as to vary it widely for different work of the cylinder, and in many cases, particularly in hydraulic benches and similar hydraulic work, where the force to be overcome is not uniform even for a short period, but increases or decreases constantly, it is desirable to provide for a constant increase or decrease in the ratio of pressure on the opposite sides of the operating-valve at which the steam-control valve will be opened or closed. I therefore preferably provide means for adjusting as required the pressure on one side of the valve so as to enable the ratio of pressures tending to move the steam-control valve in opposite directions to be adjusted as desired, so as to vary widely the ratio at which the valve will be actuated, and I preferably provide also means for varying this ratio constantly, so that the ratio between the pressures on opposite sides of the operating-valve at which the steam-control valve will be opened increases or decreases constantly in accordance with the decreasing or increasing resistance to be overcome by the hydraulic or other fluid pressure. Various means may be used for securing these results, such as weights or springs properly applied and adjustable as required for securing a constant variation of the ratio. A spring arranged so as to assist or resist the pressure on one side of the control-valve is preferably used, the increase of resistance of such spring on compression securing in a simple and efficient manner the desired result. This spring may be used either to assist or resist the pressure on the pump side of the operating-valve, this depending upon whether the resistance to be overcome increases or decreases constantly. The invention therefore includes, in addition to certain broad features of control apparatus, the combination therewith of means for adjusting the ratio of pressures on opposite sides of the operating-valve at which the steam-control valve will be actuated and of means for securing a constant increase or decrease in such ratio and certain specific features of construction and combinations of parts, all of which will be fully described and specifically claimed hereinafter.

For a full understanding of the invention a detailed description of constructions embodying all the features of the same in their preferred form will now be given in connection with the accompanying drawings, illustrating the application of the invention in connection with a combined steam accumulator and pump construction and a steam-pump without the accumulator.

In the drawings, Figure 1 is a diagrammatic side elevation of a steam pump and accumulator power plant embodying the invention as applied in connection with the hydraulic cylinder of an elevator. Fig. 2 is a central longitudinal section of the accumulator-cylinder. Fig. 3 is a detail section, on an enlarged scale, of the steam-valve for controlling the steam in accordance with the work to be done. Fig. 4 is a similar detail section of the cylinder and piston for controlling the steam-valve. Fig. 5 is a detail section of the elevator-valve in its preferred form, showing the valve in position of full supply for raising the car. Fig. 6 is a similar view showing the valve in the position of exhaust for lowering the car. Fig. 6ª shows the valve closed. Fig. 7 is a view similar to Fig. 1, showing the invention as applied to a steam-pump delivering directly to the hydraulic cylinder and with means for adjusting and constantly varying the ratio of pressures at which the steam-control valve is operated. Fig. 8 is a central detail section of the piston and cylinder construction of Fig. 7 for controlling the steam-valve.

Referring now to the construction shown in Figs. 1 to 6, I have illustrated the present invention as applied in connection with an elevator apparatus for which the power plant illustrated is admirably adapted and in which the hydraulic cylinder is moved upon the piston by the hydraulic pressure instead of the piston moving within the cylinder, and the hydraulic cylinder is connected to the elevator-car, so as to raise the latter as the cylinder is raised by the hydraulic pressure, and the cylinder is returned by the descending car, the motor fluid then passing through the operating-valve to the exhaust-tank. In this construction the vertically-moving hydraulic cylinder consists of upper and lower heads A A', each running in fixed guides B at opposite sides and carrying between them the cylinder proper, C, which is secured to the heads. Within the cylinder C is the fixed vertical pipe D, to and from which the motor fluid passes from the power plant through pipe E at the bottom of the pipe D. The hydraulic cylinder C, with its heads A A', moves up and down upon the vertical pipe D, which is open at the top, so as to admit fluid into the cylinder for applying the pressure against the upper head A of the cylinder, the lower head A' being packed suitably upon the pipe D. This elevator-apparatus construction is fully described and claimed in my application, Serial No. 12,036, filed April 7, 1900, and forms no part of the present invention. The pipe E, through which the motor fluid passes to and from the pipe D, connects through the valve-chamber F with pipe G from the steam-accumulator H and with exhast-pipe I, which connects with the exhaust-tank K. With the steam-accumulator H is connected the steam-pump L, which may be of any suitable form and which receives liquid from a supply-tank K through suction-pipe M and delivers to the accumulator through delivery-pipe N. The lower head A' carries one or more sheaves 10, over which the cables $x$ pass from their fixed ends, secured at any suitable point, upward over these sheaves 10, then downward around sheaves 11, upward and over top fixed sheaves 12, and downward to the elevator-car X, so that the cylinder moves half the distance of the car, and a pressure system is thus provided with a large cylinder movement.

The steam-accumulator H and pump L are combined and operate in the same manner, and the steam-accumulator is preferably, as shown, of substantially the construction fully described in my Patent No. 524,013, the steam passing to the pump L from the induction-pipe O through the steam-chamber of the steam-accumulator and the pipe P, through which the steam passes from the steam-accumulator to the steam end of the pump L, passing through the steam-chamber of the accumulator and its piston Q, so that the accumulator-piston controls the supply of steam to the pump L in accordance with the position of the piston, the supply of steam to the pump being increased as the movement of the piston Q to the left or against the water-pressure opens more of the holes 1 in the pipe P, through which the steam passes from the steam-chamber into said pipe, and the supply of steam to the pump being decreased as the piston moves to the right or with the water-pressure by closing the holes 1. For a fuller description of the construction and operation of this combined steam pump and accumulator reference is made to Patent No. 524,013, above referred to.

Referring now to the means for controlling the supply of steam to the accumulator H and pump L in accordance with the present invention, the steam-induction pipe O is controlled by means of a valve $a$, shown as a balanced valve of common form, which valve is arranged in a valve-chamber 14 on the pipe O and connected by the valve-stem 15 and link 16 to one end of a vertical lever 17, mounted at a fixed point on the frame, the end of which lever is connected by a link 18 with the piston-rod 19 of piston $b$, moving in cylinder 20 and connected by pipe 21 to the valve-chamber F, in which the elevator or operating valve works, and by pipe 22 to pipe G or, as shown, the water end of the accumulator H. As shown in Figs. 5 and 6, the pipe 21 connects with the chamber F in such a manner that the pressure on the cylinder side of the valve $f$ is admitted to pipe 21 when the valve $f$ is opened or partially opened for the supply of liquid from pipe G to pipe E for raising the elevator-car, this being the position shown in Fig. 5, and when the valve $f$ is shifted so as to connect pipes E I for exhaust of liquid from the cylinder and the descent of the elevator-car the pipe 21 is closed to pipe E and opened to pipe G, this being the position shown in Fig. 6. The pressure in pipe 21—that is, the pressure on the cylinder side of the valve $f$ when power is being supplied to the cylinder—is applied so as to tend to move the piston $b$ to the right and open the valve $a$, and the pressure in pipe 22—that is, on the pump side of the valve $f$—is applied to move the piston $b$ to the left and close the valve, as is clear from the drawings. An adjustable valve or cock 6 on pipe 22 is preferably provided, as shown, so as to check the flow of the water through this pipe as the piston $b$ moves toward pipe 22, and thus form a dash-pot and prevent a fluctuating movement of piston $b$, which otherwise might occur.

The apparatus is arranged so that the valve $a$ will be opened to admit steam to the accumulator when the pressure in pipe 21 has reached a point somewhat lower than the pressure in the accumulator. This result is attained in the construction shown by the differential character of the piston $b$, resulting from the piston-rod 19 on the accumulator side of the piston, which decreases the effective area of the piston $b$ on that side, so that a similar pressure on the opposite side from pipe 21 will move the piston $b$ to open the valve $a$. It will be understood, however, that the same result might be secured by a spring or other means acting to aid the pressure in pipe 21 to move the piston $b$ against the pressure from the accumulator through pipe 22. The size of the piston $b$ and its rod 19 is properly proportioned in accordance with the relative pressures on opposite sides of the piston $b$, at which the valve $a$ shall be opened to admit steam to the accumulator, the control of the steam to the pump L being controlled also by the accumulator-piston and the piston and pump being properly proportioned relatively to each other for the desired action of the power plant in connection with the elevating apparatus shown or other hydraulic apparatus. The pressure required for the work is maintained by the admission of more or less steam through the pipe O to the accumulator H, this admission of steam being controlled by the valve $a$ in accordance with its movement under the pressures on the opposite sides of the operating-valve applied as above described, the valve $a$ being opened to admit more steam to the accumulator as the pressure upon the cylinder side of the operating-valve $f$ is increased, so that the steam supplied to the accumulator and power developed thereby are increased proportionally to the increase of the load to be raised, and the piston $b$ being moved in the opposite direction to close the valve $a$ and shut off the supply of steam to the accumulator through the pipe O when the load to be raised by the hydraulic cylinder C is decreased, so that the further supply of steam to the accumulator is not required for raising the load. The steam-control valve $a$ is thus governed by the pressures on the cylinder and pump sides of the operating-valve $f$ and the steam used in the power plant proportioned directly to the work to be done.

The operation of the apparatus will be understood from a brief description. Assuming that the maximum pressure has been produced in the accumulator H by the admission of steam through pipe O and that the pump L has been operated by steam admitted from the accumulator-cylinder through the openings 1 and pipe P, in which case the accumulator-piston Q has been moved to its extreme right-hand position in the accumulator, covering the openings 1, so as to close the openings 1 and cut off the steam from pump L, the apparatus is now in condition for raising the elevator-car. If the load to be raised is less than the maximum pressure now existing in the accumulator H and the valve $f$ only partially opened, so as to throttle the water and admit only the desired pressure to the pipe E, the load will be raised without the opening of the valve $a$ and the admission of steam to the accumulator H by the expansion of the steam therein, the accumulator-piston Q being correspondingly moved to the left in the accumulator-cylinder, so as to uncover some of the openings 1 and admit steam to the pump L, which then operates to pump into the accumulator-cylinder and maintain the piston Q in its extreme position at the end of the accumulator, the valve $a$ still remaining closed. If the load be not increased during the raising of the elevator-car sufficiently to open the valve $a$ and admit steam, the shifting of the valve $f$ into the position shown in Fig. 6 for exhausting the cylinder through pipe I and the descent of the car connects the pipe G with the pipe 21, so that the pipe 21 transmits to the piston $b$ the pressure in the accumulator, and the piston $b$ is then moved by the greater total pressure on the side with which pipe 21 connects, so as to open the valve $a$ and admit steam to the accumulator-cylinder. The valve $a$ being open, the pressure in the accumulator-cylinder is increased to the maximum pressure, the accumulator-piston Q moving to the left in the accumulator-cylinder, and thus uncovering the openings 1, so that steam is supplied to the pump L and the latter actuated to pump water into the accumulator-cylinder until the piston Q is again moved to its extreme right-hand position at the end of the accumulator-cylinder, when the openings 1 are closed, cutting the steam off the pump L and stopping the latter. As the pressure in the pipe 21 remains the same as that in the accumulator while the operating-valve $f$ is in the exhausting position, (shown in Fig. 6,) the valve $a$ remains open as long as the operating-valve $f$ remains in this position; but when the valve $f$ is moved to position to stop the car by closing the exhaust, as shown in Fig. 6ª, pipe 21 is again connected with pipe E, the pressure in pipe 21 reduced, and the valve $a$ thus closed by the excess of pressure on the piston-rod side of the piston $b$ transmitted from the accumulator through pipe 22. If the load to be raised in starting the car is such that the pressure required is substantially the maximum pressure of the accumulator or the somewhat less pressure at which the valve $a$ is to be opened in accordance with the relative sizes of the piston $b$ and piston-rod 19, as above explained, or the load is increased to this amount during the raising of the car, this cylinder-pressure, transmitted through pipe 21, will move the piston $b$ against the pressure on the opposite side transmitted from the accumulator through pipe 22, and thus open the valve $a$ to admit steam to the accumulator, thus maintaining the maximum pressure in the accumulator throughout the raising of this maximum load. If the load be reduced after the car has commenced its upward movement, so that the maximum pressure in the accumulator is not required, the shifting of the valve $f$, so as to reduce the pressure in the pipe E to the amount required to raise the load, will correspondingly reduce the pressure transmitted through pipe 21 to piston $b$, and the valve $a$ will then be closed by the pressure on the opposite side of the piston $b$, transmitted from the accumulator through pipe 22. It will be understood that when the elevator apparatus is stopped, so that there is no load upon the pipe E, the valve $f$ will be in its central position, closing both the pipes G I to the pipe E, and the pipe 21 will be connected to the pipe E and the pressure on piston $b$ from pipe 21 thus reduced, so that the pressure from the accumulator applied through the pipe 22 to the piston $b$ will close the steam-controlled valve $a$, so that the pump is stopped as long as the elevating apparatus is out of operation. The valve $a$, however, will preferably be arranged or other means provided for admitting a smaller quantity of steam constantly to the accumulator and pump, so as to keep the latter in slow operation or in condition for immediate operation if stopped.

In Figs. 7 and 8 I have shown a construction in which some of the features of the invention are applied with a steam-pump delivering directly into a hydraulic cylinder and with means for adjusting the pressure tending to actuate the valve $a$, so as to vary the action of the valve widely in accordance with the work to be performed, and I have shown in this construction also means for constantly varying the pressure tending to move the valve in one direction, so as to secure a constant variation of the ratio between the pressures by which the valve is moved in opposite directions so as to vary this ratio in accordance with a constant increase or decrease of the resistance to be overcome by the hydraulic pressure. In this construction the pump L, which is shown as of substantially the same construction as in Fig. 1, delivers directly through the force-main N, operating-valve $f$, and pipe E to the hydraulic cylinder R, which may be of any suitable construction and applying the power for the desired work in any suitable manner, the exhaust-pipe I connecting through the exhaust-tank K with suction-pipe M. The induction-pipe O and valve-chamber 14 thereon are the same as in the construction previously described, except that the induction-pipe O delivers directly to the steam end of the pump L instead of to an accumulator. The construction and arrangement of the control apparatus are generally the same as described in connection with Figs. 1 to 5, so that the same reference-letters may be used for corresponding parts of the two constructions; but a somewhat different action is required on account of the omission of the accumulator, and the pipe 21 is connected so as to always transmit the pressure on the cylinder side of the operating-valve $f$, being shown as connected to the pipe E between the valve-chamber F and cylinder R. This pipe 21 therefore is not connected to the supply-pipe when the valve $f$ is shifted for exhaust, as in the construction previously described, but transmits successively the working and exhaust pressure in cylinder R. The pipe 22 for transmitting the pressure on the pump side of the operating-valve to the piston $b$ in cylinder 20 communicates with the force-main N instead of with the accumulator, as in the construction previously described. In this construction (shown in Figs. 7 and 8) it will be understood that the steam admission to the pump L through pipe O is controlled by the valve $a$, which valve is controlled by the pressures on opposite sides of the operating-valve $f$ transmitted to piston $b$ through pipes 21 22, so that the valve $a$ is closed to cut off steam when the load or pressure in cylinder R is less and opened to admit steam when the load or pressure in cylinder R is increased, so that the amount of steam used is in accordance with and determined by the work to be performed. For the purpose of adjusting the pressure upon the piston $b$ so as to secure the desired action of the valve $a$ the lever 17 in this construction is provided with horizontal arms 23 on opposite sides of the pivot, each of these arms being provided with a series of perforations 3, in any one of which may be suspended, upon the lever-arm 23 on one or the other side of the pivot, a weight 4, which weight may thus be applied either to assist the pressure upon the pump side of the operating-valve $f$ by being suspended upon the left arm of lever 17, as shown, so as to tend to move the lever 17 to the left and valve $a$ to the right, as shown in Fig. 3, tending to close the valve, or by suspending the weight upon the opposite or right arm 23 of lever 17 it will assist the pressure on the cylinder side of the operating-valve $f$ transmitted to piston $b$ through pipe 21 and tend to move the lever 17 to the right and valve $a$ to the left, thus tending to open the valve. It will be seen that by thus suspending the weight 4 on one or the other of the arms 23 and with openings 3 more or less distant from the pivot of lever 17 the weight may tend to move the valve in one direction or the other and the leverage and pressure of the weight upon the valve $b$ be increased or diminished, as desired. By this means the ratio between the pressures on the cylinder and pump side of the operating-valve $f$ at which the valve $a$ will be moved may be varied as desired, in accordance with the character of the work to be performed, and the valve $a$ made to open for the admission of steam either at a greater or less difference between the pressures of the cylinder and pump side of the operating-valve $f$, as desired. I have shown also a coiled spring 24 on the piston-rod 19, between the head of the cylinder 20 and a collar 25 on the piston-rod, this spring 24 tending to move the piston $b$ to the right and assist the pressure on the cylinder side of the operating-valve $f$, transmitted through the pipe 21. As the pressure exerted by this spring, tending to move the piston $b$ to the right and open the valve, decreases constantly as the valve opens and the spring expands, it will be seen that the ratio between the cylinder and pump pressures at which the valve is moved to admit more steam to the pump increases constantly, so that a higher pressure in the cylinder is required to move the valve for increase of the steam-supply, and the highest economy of steam and most efficient operation of the apparatus is thus secured in the application of the hydraulic cylinder to work in which the resistance to be overcome by the hydraulic pressure constantly increases during the operation of the apparatus, as is frequently the case in bench-work. If the resistance to be overcome by the hydraulic pressure decreases constantly, a similar spring construction may be used; but the spring will be applied so as to assist the pump-pressure instead of so as to resist the pump-pressure, as in the construction shown.

It will be understood that other means for adjusting the control apparatus, either for a constantly-varying operation of the valve or for an adjustment of the operation without the constant variation, may be used, and that either of these features may be used without the other, although both are preferably combined. Thus in the construction shown the spring 24 may be omitted, if desired, and only the uniform adjustment of the weight 4 be employed, or the spring 24 may be employed without the weight construction for uniform adjustment, and any other suitable devices may be used instead of a spring or the suspended-weight construction shown. Various other means may readily be devised for this purpose, and many modifications may be made in the construction and combination of the other parts shown without departing from the invention, and I am not to be limited to the specific construction or arrangement of any of the devices, which are illustrated as a simple, efficient, and convenient embodiment of my invention.

It will be understood that my invention in control apparatus may be used not only with a steam pump or accumulator, but with any other form of apparatus where it is desired to control the steam or other source of power used to supply a hydraulic or similar cylinder in accordance with the work to be done, and that my control apparatus may be used for controlling the supply of current to an electric pump instead of the supply of steam to a steam-pump, proper devices being substituted for the valve $a$.

What I claim is—

1. The combination with a hydraulic or similar cylinder and apparatus for forcing fluid into the cylinder, of a piston subjected on opposite sides to the pressure of the fluid in the cylinder and in the apparatus during the admission of fluid to the hydraulic cylinder and on both sides to the pressure of the fluid in the apparatus during the exhaust of fluid from said cylinder, mechanism controlled by the movement of said piston for controlling the supply of power to said apparatus, and adjustable means for aiding the pressure on one side of the piston, substantially as described.

2. The combination with a hydraulic or similar cylinder and its valve for controlling the supply and exhaust of fluid for said cylinder, and a pump for forcing fluid into the cylinder, of a piston subjected on opposite sides to the pressure of the fluid on the cylinder and pump sides of the valve during the admission of fluid to the hydraulic cylinder and on both sides to the pressure of fluid on the pump side during the exhaust of fluid from said cylinder, and mechanism controlled by the movement of said piston for controlling the supply of power to said pump, substantially as described.

3. The combination with a hydraulic or similar cylinder and its valve for controlling the supply and exhaust of fluid for said cylinder and a pump for forcing fluid into the cylinder, of a piston subjected on opposite sides to the pressure of the fluid on the cylinder and pump sides of the valve during the admission of fluid to the hydraulic cylinder and on both sides to the pressure of fluid on the pump side during the exhaust of fluid from said cylinder, mechanism controlled by the movement of said piston for controlling the supply of power to said pump, and adjustable means for aiding the pressure on one side of the piston, substantially as described.

4. The combination with a hydraulic or similar cylinder and its valve for controlling the supply and exhaust of fluid for said cylinder, and a steam-pump for forcing fluid into the cylinder, of a piston subjected on opposite sides to the pressure of the fluid on the cylinder and pump sides of the valve during the admission of fluid to the hydraulic cylinder and on both sides to the pressure of fluid on the pump side during the exhaust of fluid from said cylinder, and a valve actuated by the movement of said piston for controlling the supply of steam to said pump, substantially as described.

5. The combination with a hydraulic or similar cylinder and its valve for controlling the supply and exhaust of fluid for said cylinder, and a steam-pump for forcing fluid into the cylinder, of a piston subjected on opposite sides to the pressure of the fluid on the cylinder and pump sides of the valve during the admission of fluid to the hydraulic cylinder and on both sides to the pressure of fluid on the pump side during the exhaust of fluid from said cylinder, a valve actuated by the movement of said piston for controlling the supply of steam to said pump, and adjustable means for aiding the pressure on one side of the piston, substantially as described.

6. The combination with a hydraulic or similar cylinder and apparatus for forcing fluid into the cylinder, of a piston subjected on opposite sides to the pressure of the fluid in the cylinder and in the apparatus during the admission of fluid to the hydraulic cylinder and on both sides to the pressure of the fluid in the apparatus during the exhaust of fluid from said cylinder, and mechanism controlled by the movement of said piston for controlling the supply of power to said apparatus, substantially as described.

7. The combination with a hydraulic or similar cylinder and apparatus for forcing fluid into the cylinder, of a differential piston subjected on opposite sides to the pressure of the fluid in the cylinder and in the apparatus during the admission of fluid to the hydraulic cylinder and on both sides to the pressure of the fluid in the apparatus during the exhaust of fluid from said cylinder, and mechanism controlled by the movement of said piston for controlling the supply of power to said apparatus, substantially as described.

8. The combination with a hydraulic or similar cylinder and its valve for controlling the supply and exhaust of fluid for said cylinder, and a steam-pump for forcing fluid into the cylinder, of a steam-accumulator between the pump and cylinder controlling the supply of steam to the pump by its piston, a piston subjected on opposite sides to the pressure of the fluid on the cylinder and pump sides of the valve during the admission of fluid to the hydraulic cylinder and on both sides to the pressure of fluid on the pump side during the exhaust of fluid from said cylinder, and a valve actuated by the movement of said piston for controlling the supply of steam to said accumulator, substantially as described.

9. The combination with a hydraulic or similar cylinder and its valve for controlling the supply and exhaust of fluid for said cylinder, and a steam-pump for forcing fluid into the cylinder, of a steam-accumulator between the pump and cylinder controlling the supply of steam to the pump by its piston, a differential piston subjected on opposite sides to the pressure of the fluid on the cylinder and pump sides of the valve during the admission of fluid to the hydraulic cylinder and on both sides to the pressure of fluid on the pump side during the exhaust of fluid from said cylinder, and a valve actuated by the movement of said piston for controlling the supply of steam to said accumulator, substantially as described.

10. The combination with a hydraulic or similar cylinder and its valve for controlling the supply and exhaust of fluid for said cylinder, and a steam-pump for forcing fluid into the cylinder, of a steam-accumulator between the pump and cylinder controlling the supply of steam to the pump by its piston, a piston subjected on opposite sides to the pressure of the fluid on the cylinder side of the valve and in the accumulator during the admission of fluid to the hydraulic cylinder and on both sides to the pressure of fluid in the accumulator during the exhaust of fluid from said cylinder, and a valve actuated by the movement of said piston for controlling the supply of steam to said accumulator, substantially as described.

11. The combination with a hydraulic or similar cylinder and its valve for controlling the supply and exhaust of fluid for said cylinder, and a steam-pump for forcing fluid into the cylinder, of a steam-accumulator between the pump and cylinder controlling the supply of steam to the pump by its piston, a differential piston subjected on opposite sides to the pressure of the fluid on the cylinder side of the valve and in the accumulator during the admission of fluid to the hydraulic cylinder and on both sides to the pressure of fluid in the accumulator during the exhaust of fluid from said cylinder, and a valve actuated by the movement of said piston for controlling the supply of steam to said accumulator, substantially as described.

12. The combination with a hydraulic or similar cylinder and its valve mechanism, of cylinder 20 and piston $b$, pipes 21, 22 connecting said cylinder 20 on opposite sides of the piston with the fluid-spaces on opposite sides of the valve mechanism during the admission of fluid to said cylinder and with the supply side of the valve mechanism by both pipes during the exhaust of fluid from the cylinder, a power apparatus controlled by the movement of said piston, and adjustable valve 6 on said pipe 22, substantially as described.

13. The combination with a hydraulic or similar cylinder and its valve mechanism, of cylinder 20 and piston $b$, pipes 21, 22 connecting said cylinder on opposite sides of the piston with the fluid-spaces on opposite sides of the valve mechanism during the admission of fluid to said cylinder and with the supply side of the valve mechanism by both pipes during the exhaust of fluid from the cylinder, a power apparatus controlled by the movement of said piston, and a spring or equivalent device tending to move the piston in one direction, substantially as described.

14. The combination with a hydraulic or similar cylinder and its valve mechanism, of cylinder 20 and piston $b$, pipes 21, 22 connecting said cylinder on opposite sides of the piston with the fluid-spaces on opposite sides of the valve mechanism, a power apparatus controlled by the movement of said piston, and means for applying a constant adjustable pressure to said piston tending to move it in one direction, substantially as described.

15. The combination with a hydraulic or similar cylinder and its valve mechanism, of cylinder 20 and piston $b$, pipes 21, 22 connecting said cylinder on opposite sides of the piston with the fluid-spaces on opposite sides of the valve mechanism, a power apparatus controlled by the movement of said piston, a spring or equivalent device tending to move the piston in one direction, and lever 17 between piston $b$ and the power apparatus provided with one or more arms 23 for applying adjustable pressure tending to move the piston in one direction, substantially as described.

16. The combination with a hydraulic or similar cylinder and its valve mechanism, of cylinder 20 and piston $b$, pipes 21, 22 connecting said cylinder on opposite sides of the piston with the fluid-spaces on opposite sides of the valve mechanism during the admission of fluid to said cylinder and with the supply side of the valve mechanism by both pipes during the exhaust of fluid from the cylinder, pump L, valve $a$ controlling the supply of steam to said pump, and connections between piston $b$ and valve $a$ for controlling the valve by the piston, substantially as described.

17. The combination with a hydraulic or similar cylinder and its valve mechanism, of cylinder 20 and piston $b$, pump L, steam-accumulator H, means for controlling the passage of steam to the pump by the position of the accumulator-piston, valve $a$ controlling the supply of steam to the accumulator and pump, pipes 21, 22 connecting cylinder 20 on opposite sides of the piston with the hydraulic cylinder and accumulator during the admission of fluid to said cylinder and with the accumulator by both pipes during the exhaust of fluid from the cylinder, and connections between piston $b$ and valve $a$ for controlling the valve by the piston, substantially as described.

18. The combination with a hydraulic or similar cylinder, of cylinder 20 and piston $b$, pipes 21, 22 connecting said cylinder on opposite sides of the piston with the fluid-spaces on opposite sides of the valve mechanism, pump L, steam-accumulator H, means for controlling the passage of steam to the pump by the position of the accumulator-piston, valve $a$ controlling the supply of steam to the accumulator and pump, pipe 22 connecting cylinder 20 on one side of the piston with the accumulator, pipe 21 connecting with cylinder 20 on the opposite side of the piston, and a valve-chamber and valve for the hydraulic cylinder arranged to connect pipe 21 with the hydraulic cylinder on the admission of fluid and when the cylinder-valve is closed and to connect pipe 21 with the accumulator on the exhaust, and connections between piston $b$ and valve $a$ for controlling the valve $a$ by the piston, substantially as described.

In testimony whereof I have hereunto set my hand in the presence of two subscribing witnesses.

CHARLES C. WORTHINGTON.

Witnesses:
  C. J. SAWYER,
  A. A. V. BOURKE.